June 3, 1941.  C. R. HESSLER  2,244,197
BEARING
Filed March 25, 1937
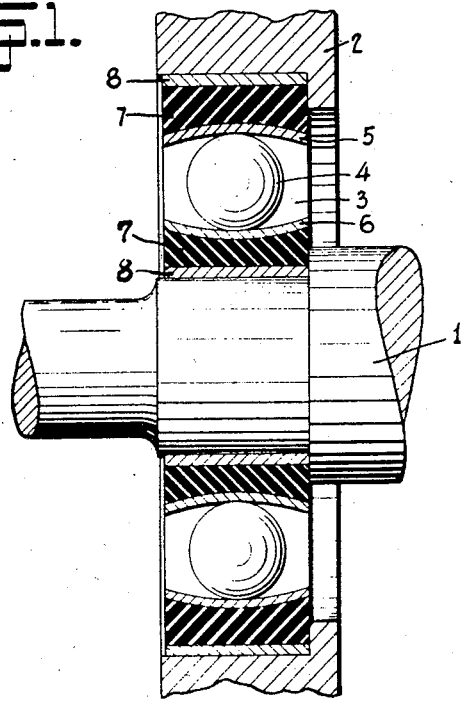
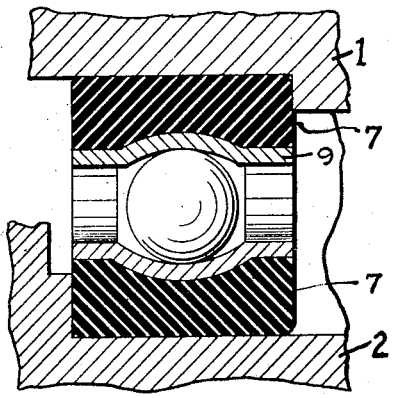
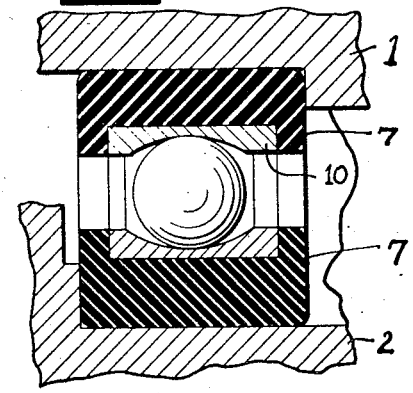
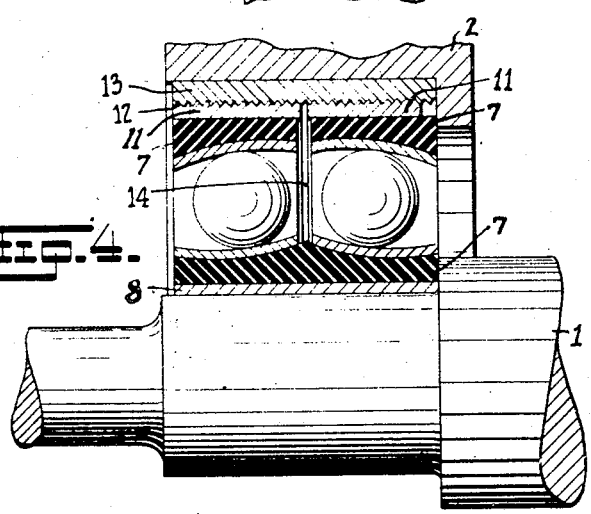
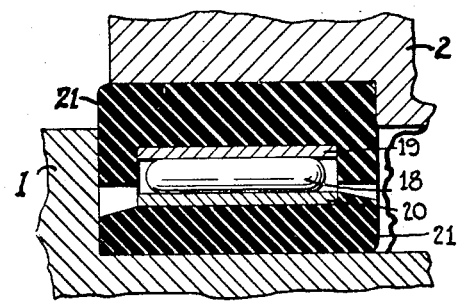
INVENTOR.
CHRISTIAN RUDOLPH HESSLER.
BY Patented June 3, 1941

2,244,197

UNITED STATES PATENT OFFICE 2,244,197

BEARING

Christian Rudolph Hessler, Leipzig, Germany

Application March 25, 1937, Serial No. 132,893
In Germany March 25, 1936

9 Claims. (Cl. 308—216)

This invention relates to radial bearings of the rolling type, in which the running surfaces of the rolling elements, such as balls, rollers or pins, consist of thin metal rings, preferably made of steel.

According to the invention, these bearing rings are embedded in an elastic, sound-reducing and insulating manner in rubber or, preferably, synthetic resins of the cresol-formaldehyde, urea or thio-urea-formaldehyde group, or in other suitable substances. The rings may be vulcanized to their bed or pressed into it or held thereto in other suitable ways.

Bearings according to the invention transmit vibrations of shafts arranged therein to other machine parts either not at all or only to a very slight extent and also effectively protect other machine parts against impacts to which the shafts may be subjected. Compared with ordinary bearings, bearings according to the invention eliminate vibrations and shocks during operation, as indicated by practically noiseless running. A shaft can also be electrically insulated with respect to other machine parts, whereby stray and eddy currents can be materially reduced.

The invention further permits a decrease in the size of steel bearings of the usual type so as to save steel and reduce weight.

The invention affords therefore considerable advantages and makes it possible to operate at lower cost.

By way of example, the invention is illustrated in the accompanying drawing, in which Figure 1 is a view, partly in section, of a shaft disposed in a ball bearing, the running faces of which are embedded according to the invention;

Fig. 2, a view, partly in section, of another form of ball bearing;

Fig. 3, a view, partly in section, of still another form of ball bearing;

Fig. 4, a section of a part of an adjustable double ball bearing;

Fig. 5, a view, partly in section, of a roller bearing; and

Fig. 6, a view, partly in section, of a pin bearing.

Referring to the drawing, the shaft 1 is rotatably arranged in a holder 2 by means of an interposed ball bearing 3. The balls 4 run on an outer ring 5 and an inner ring 6, the ring 5 having a larger diameter than the ring 6. The rings 5 and 6 are embedded in an artificial mass 7 framed by the fitting rings 8 relative to the holder 2 and the shaft 1. The rings 5 and 6 are made of best steel. The rolling elements may also be held in position by suitable cages or retainers of known type.

If materials of sufficient strength and toughness like synthetic resins are employed, the fitting rings 8 can be omitted without the least risk. Such bearings are shown in Figs. 2 and 3. The rings 9 and 10 have different profile, and grooved rings like 10 afford the least possible lateral play. In these cases the bulk of the races is made of synthetic resin, being steel lined only where the rolling elements run therein and thereon.

In double ball bearings as shown in Fig. 4, which are provided with inclined running faces, the outer fitting rings 11 possess a thread 12 and are secured by being screwed into a carrying ring 13 fitted with internal thread. If in the course of operation the balls are loosened between their rings, this play can be eliminated by screwing the rings 11 farther into the threaded ring 13 and thus reducing the gap 14.

Fig. 5 shows a roller bearing. The rollers 15 run in the rings 16 and 17 which are embedded by vulcanization for instance in hard rubber.

Fig. 6 shows a pin bearing. 18 designates the pins, 19 and 20 are the bearing rings and 21 is the bed of artificial resin.

The bearings according to the invention can be installed and exchanged like known bearings.

I claim:

1. A radial bearing, comprising a plurality of rolling elements, an outer and an inner, relatively thin steel ring each provided with a grooved running face for the rolling elements, and an annular bed of synthetic resin for said rings dimensioned so as to transmit the load transmitted by the rolling elements without deformation to the support.

2. A bearing according to claim 1, wherein the running groove is produced by milling.

3. A self-contained bearing, comprising a plurality of rolling members, and races respectively comprising an outer and an inner metal, relatively thin ring between which the rolling members are running and radially engaged and, rubber beds to which the rings are vulcanized, said ring members being dimensioned so as to transmit the load transmitted by the rolling members without deformation to a support.

4. A self-contained ball or roller bearing, comprising an outer and an inner race, and rolling elements runningly accommodated in radial thrust between said races, each of said races having a hard metal layer where it is in running contact with said elements and a solid non-metallic reenforcing layer adjacent to said metal layer and representing the outward enclosure of said bearing.

5. A self-contained bearing having rolling elements, races made of rigid, non-metallic material, and relatively thin metallic linings on said races for running contact with said rolling elements.

6. A self-contained bearing having rolling elements, races made of rigid, non-metallic material, and relatively thin metallic linings covering cylindrical surfaces of said races.

7. A self-contained bearing having rolling elements, races made of rigid, non-metallic material, and relatively thin metallic linings embedded in said races for running contact with said rolling elements.

8. A self-contained bearing having rolling elements, races made of rigid, non-metallic material, said material forming the outer cylindrical surfaces and end faces of said bearing taken as a whole, and relatively thin metallic linings on said races for running contact with said rolling elements.

9. A self-contained bearing having rolling elements, races made of rigid, non-metallic material, and relatively thin metallic linings on said races machined for running contact with said rolling elements.

CHRISTIAN RUDOLPH HESSLER.